May 30, 1933.  E. C. SCOTT  1,911,401
BATTERY HOLDER
Filed June 11, 1932
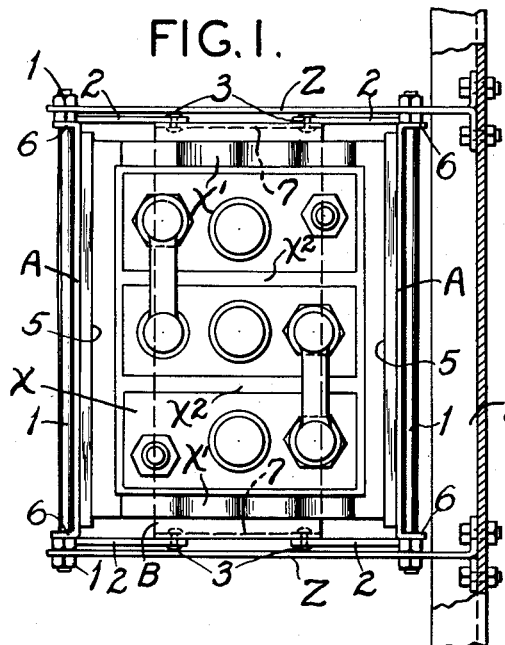
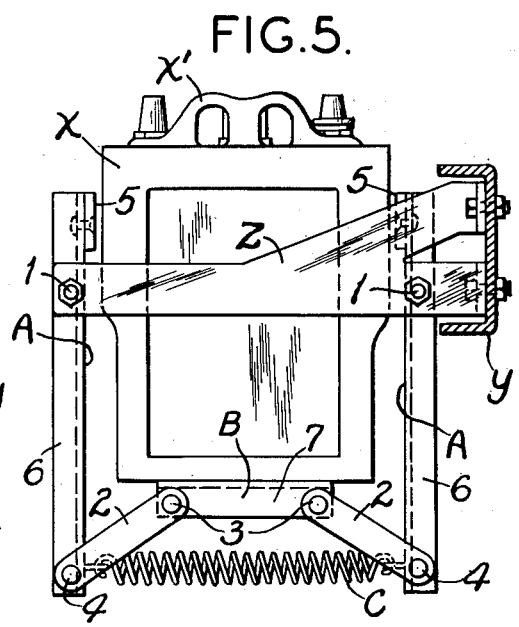
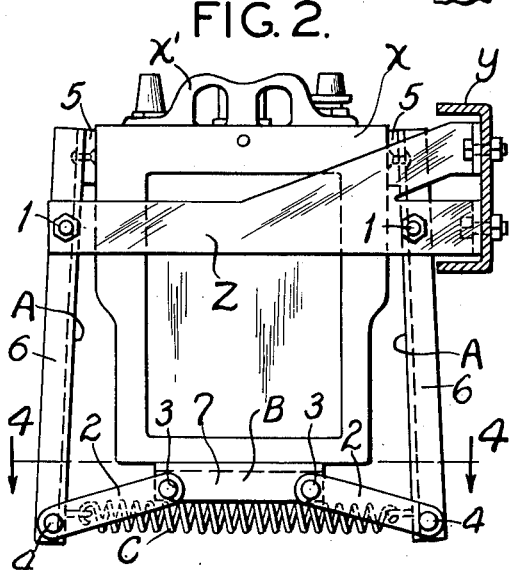
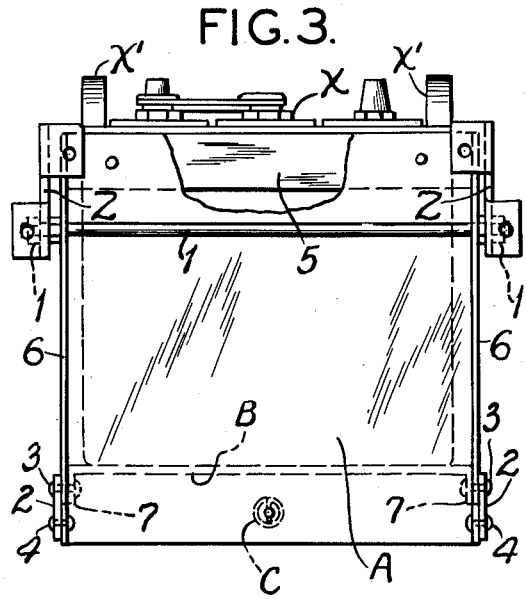
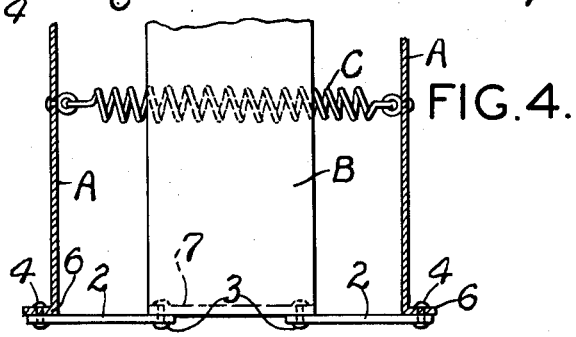
INVENTOR:
ELMO C. SCOTT
BY Bakewell & Church
ATTORNEYS Patented May 30, 1933

1,911,401

UNITED STATES PATENT OFFICE

ELMO C. SCOTT, OF ST. LOUIS, MISSOURI

BATTERY HOLDER

Application filed June 11, 1932. Serial No. 616,636.

This invention relates to battery holders, such as are used on power-operated vehicles for sustaining an electric storage battery.

One object of my invention is to provide an inexpensive storage battery holder that will hold a battery so securely and in such a manner that vibration will not cause the battery to work loose.

Another object is to provide a storage battery holder which is of such design or construction that the battery can be installed and removed quickly, and without the necessity of manipulating screws, nuts or similar fastening devices.

And still another object of the invention is to provide a storage battery holder which is of such construction that it will not cause the case of the battery to buckle in instances where the battery case is made of hard rubber or a molded composition. Other objects and desirable features of my invention will be hereinafter pointed out.

Figure 1 of the drawing is a top plan view of my improved battery holder.

Figure 2 is an end view of said holder.

Figure 3 is a side elevational view.

Figure 4 is a horizontal sectional view, taken on the line 4—4 of Figure 2, looking in the direction indicated by the arrows; and Figure 5 is an end view, showing the parts of the holder in the position which they assume when an upward pull is exerted on the battery in the operation of removing it from the holder.

In the accompanying drawing which illustrates the preferred form of my invention embodied in a holder for a storage battery that is used on a power-operated vehicle, $x$ designates the battery and $y$ designates one of the frame members of the chassis of the vehicle. Said battery holder, briefly described, consists of two opposed clamping members pivotally mounted on a supporting structure in such a way that the battery can be positioned between the same, a support on which the battery is adapted to rest, and a means for connecting or joining said battery support with said clamping members in such a way that the weight of the battery will cause said clamping members to be moved into clamping engagement with the battery. So long as the battery remains on the battery support, the clamping members will remain in tight engagement with the battery, and the vibration to which the battery and the holder are subjected in service has no tendency to cause the battery to work loose. This is true, even though the portions of the clamping members that engage the battery become worn or deteriorate from any cause. If desired, the holder can be so constructed that when an upward pull is exerted on the battery, during the operation of removing the battery from the holder, the clamping members will move automatically in a direction to release the battery.

In the preferred form of my invention herein illustrated the clamping members above referred to are formed by two vertically-disposed plates A arranged in opposed relation and connected by horizontally-disposed pivots 1 to any suitable kind of a supporting structure herein illustrated as being formed by a pair of arms $z$ that project laterally from the frame member $y$ of the chassis. A horizontally-disposed battery support B is arranged between the clamping members A adjacent the lower ends of same, and links 2 are pivotally attached to the battery support B and to the lower ends of the clamping members A in such a way that when the battery $x$ is placed upon the support B, said support will move downwardly, due to the weight of the battery, and the links 2 will force the lower ends of the clamping members A outwardly, thereby causing the upper ends of said clamping members to swing inwardly into tight engagement with the battery, as shown in Figure 2. So long as the battery remains on the support B, the clamping members A will be held pressed tightly against the battery, and any vibration to which the holder or the battery are subjected merely tends to cause the battery to be more tightly gripped by the clamping members A. The links 2 are of such length and the pivots 1 of the clamping members are so arranged, that the links 2 are always maintained in an inclined position with the pivots 3 that join the inner ends of said links to the battery support B located in a horizontal plane higher than the pivots 4 which join the outer ends of the links 2 to the clamping members A. Accordingly, the weight of the battery is constantly used to exert an outward thrust on the lower ends of the clamping members A, with the result that it is impossible for the battery to work loose. I prefer to construct the clamping members A from metal and attach strips of wood or other suitable nonmetallic material 5 to the upper edge portions of said clamping members so as to form battery contacting faces on said clamping members that will not deteriorate or be injuriously affected in the event the electrolyte of the battery splashes onto the same. The strips 5 are not essential, however, and may be omitted without departing from the spirit of my invention.

In order to facilitate the removal of the battery from the holder a means is provided for automatically disengaging the clamping members from the battery, or moving said clamping members in a direction to release the battery, whenever the weight or load of the battery on the support B is removed. The means just referred to is herein illustrated as consisting of a contractile spring C arranged transversely of the battery support B on the underside of same, and having its opposite ends attached to the lower end portions of the clamping members A, said spring being of such tension that it will permit the upper end portions of the clamping members A to move into clamping engagement with the battery when the battery is applied to the support B. To remove the battery from the holder the user grasps the handles $x'$ of the battery and exerts an upward pull on the battery, thereby removing the weight of the battery from the support B, whereupon the support B will move upwardly and the upper end portions of the clamping members A will swing outwardly automatically under the influence of the spring C.

The component parts of my improved battery holder may be of various shapes and may be combined in various ways without departing from the spirit of my invention. The clamping members A can be conveniently formed from metal plates, provided at their ends with angularly-disposed flanges 6 that reinforce and strengthen said plates and also form lugs or brackets for the pivots 1 and the pivots 4 previously referred to. The battery support B can also be conveniently formed from a metal plate, provided at its ends with depending flanges 7, that strengthen said plate and serve as lugs or brackets for the pivots 3. The pivots 1 are herein illustrated as being formed from two long bolts or rods that are attached to the supporting arms $z$ on the chassis frame in such a way that they serve as tie bars for said arms $z$ and co-operate with same to form in effect a rectangularly-shaped frame that completely surrounds the battery. Said bolts or pivots 1 are preferably arranged on the outside of the clamping members A, and consequently, they effectively prevent the clamping members A from bulging or flexing outwardly intermediate their ends. Obviously, the clamping members A may be supported or pivoted in numerous other ways.

One very desirable characteristic of a battery holder of the construction above described is, that it will not cause the battery case to buckle or bend out of shape in hot weather in the event the battery case is made up of rubber or a similar molded composition. This is because the clamping members A are so constructed and arranged that the clamping force or pressure which they exert on the battery is applied to the corner portions of the battery case in such a way that the end walls of the battery case and the intermediate cross webs $x^2$ of the battery case (see Figure 1) resist or oppose inward flexing of the side wall portions of the battery case on which the clamping members A bear. In other words, in my improved holder the battery is confined or held in the holder by opposed clamping members that act on the side walls of the battery case and which are preferably made long enough so that they will contact with the corner portions of the battery case formed by the junction of the side walls and end walls of the battery case, thereby effectively eliminating the possibility of the battery case bulging or flexing out of shape, due to the pressure exerted on same by the clamping members.

While I have stated that the clamping members A preferably extend lengthwise of the battery, it will be obvious that the holder could be designed so as to cause the clamping members to act on the end walls instead of the side walls of the battery case, but I prefer to construct the holder in the particular manner herein illustrated for the reasons mentioned. Moreover, while I prefer to equip the holder with two pivotally mounted clamping members between which the battery is adapted to be positioned, and join the lower end portions of said clamping members to a toggle like structure that comprises a shiftable battery support, which, in effect, floats between the clamping members, I wish it to be understood that my invention is not limited to a battery holder of the particular design or construction herein illustrated, as my broad idea consists in using the weight of the battery to actuate a clamping means or retaining means that holds the battery against movement, and so long as the holder embodies this essential or distinguishing characteristic, the component parts of same can be constructed and arranged in various ways.

Having thus described my invention, what I claim as new and desire to secure by Letters Patent is:

1. A battery holder, comprising a supporting structure, opposed pivotally mounted clamping members on said supporting structure arranged at opposite sides of the battery, and a floating support for the battery positioned between said clamping members and combined with same in such a way that movement of said support, produced by mounting the battery thereon, moves the lower ends of said clamping members outwardly and thus causes the battery to be clamped by the upper end portions of said members.

2. A battery support, comprising a supporting structure, opposed, pivotally mounted clamping members on said supporting structure between which the battery is adapted to be positioned, a support for the battery arranged between said clamping members and adapted to move downwardly when the battery is applied to same, and connections between said support and clamping members for utilizing the downward movement of said support to move the lower ends of said clamping members outwardly and thus force the upper ends of said members into tight engagement with the battery.

3. A battery support, comprising opposed, pivotally mounted clamping members between which the battery is adapted to be positioned, a support for the battery arranged between said members and adapted to move downwardly when the battery is applied to same, connections between said support and clamping members for utilizing the downward movement of said support to force said clamping members into engagement with the battery, and means for disengaging said clamping members from the battery when the battery is subjected to a pull in a direction to remove the weight of same from said support.

4. A battery holder, comprising opposed, pivotally mounted clamping members that are adapted to engage the battery, a toggle structure attached to the lower ends of said clamping members and provided with a support on which the battery is adapted to be rested, and a spring attached to said toggle structure for disengaging the clamping members from the battery when the battery is subjected to an upward pull during the operation of removing it from the holder.

5. A battery holder, comprising a pair of supporting arms, angularly-disposed tie bars that join said arms together, pivotally mounted clamping members on said tie bars between which the battery is adapted to be positioned, and a shiftable support for the battery connected by links with said clamping members.

6. A battery holder, comprising a supporting structure, a pair of opposed plates between which the battery is adapted to be positioned, end flanges on said plates, horizontally-disposed rods arranged on the outside of said plates and passing through said flanges and said supporting structure for pivotally mounting said plates on said supporting structure, and a shiftable battery support arranged between the lower end portions of said plates and joined to same by pivotal links.

ELMO C. SCOTT.